(12) United States Patent
Nakashima et al.

(10) Patent No.: US 9,815,132 B2
(45) Date of Patent: Nov. 14, 2017

(54) WIRE ELECTRIC DISCHARGE MACHINE

(71) Applicant: FANUC Corporation, Yamanashi (JP)

(72) Inventors: Yasuo Nakashima, Yamanashi (JP); Yasuo Hasegawa, Yamanashi (JP); Akiyoshi Kawahara, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 175 days.

(21) Appl. No.: 14/790,034

(22) Filed: Jul. 2, 2015

(65) Prior Publication Data

US 2016/0001385 A1   Jan. 7, 2016

(30) Foreign Application Priority Data

Jul. 4, 2014   (JP) .................................. 2014-138684

(51) Int. Cl.
 *B23H 1/02* (2006.01)
 *B23H 7/04* (2006.01)

(52) U.S. Cl.
 CPC .............. *B23H 1/022* (2013.01); *B23H 1/02* (2013.01); *B23H 7/04* (2013.01)

(58) Field of Classification Search
 CPC ............. B23H 1/022; B23H 7/04; B23H 1/02
 See application file for complete search history.

(56) References Cited

U.S. PATENT DOCUMENTS

| | | | |
|---|---|---|---|
| 2008/0190879 A1 | 8/2008 | Holtz et al. | |
| 2012/0193326 A1* | 8/2012 | Mitsuyasu | B23H 7/04 219/69.17 |
| 2013/0015162 A1 | 1/2013 | Matsunaga et al. | |
| 2014/0203000 A1 | 7/2014 | Mitsuyasu et al. | |
| 2014/0374385 A1 | 12/2014 | Kawano et al. | |
| 2015/0246403 A1* | 9/2015 | Yamada | B23H 7/04 219/69.12 |

FOREIGN PATENT DOCUMENTS

| | | | |
|---|---|---|---|
| EP | 0534353 A1 | | 3/1993 |
| JP | 59-064233 A | * | 4/1984 |
| JP | 62-218024 A | * | 9/1987 |
| JP | 7-266138 A | | 10/1995 |
| JP | 2012-166332 A | | 9/2012 |
| JP | 2014-079876 A | | 5/2014 |
| WO | 2013/157373 A1 | | 10/2013 |
| WO | 2013/187201 A1 | | 12/2013 |

OTHER PUBLICATIONS

Extended European Search Report in EP Application No. 15169421.3, dated Nov. 11, 2015.
Office Action dated Oct. 20, 2015, corresponding to Japanese Patent Application No. 2014-138684.

* cited by examiner

*Primary Examiner* — Geoffrey S Evans
(74) *Attorney, Agent, or Firm* — Hauptman Ham, LLP

(57) ABSTRACT

In a wire electric discharge machine, a control unit is configured to deposit constituents of a wire electrode between a workpiece and a portion to be cut off from the workpiece to bond the workpiece and the portion to be cut off by outputting a signal for making an output voltage of a variable DC power supply lower than during normal machining and the on-time of a second switching element longer than during the normal machining, at least in a part of a machining path.

1 Claim, 5 Drawing Sheets

OCCURRENCE OF ELECTRIC DISCHARGE

OCCURRENCE OF ELECTRIC DISCHARGE

:::page 
WIRE ELECTRIC DISCHARGE MACHINE

RELATED APPLICATIONS

The present application claims priority to Japanese Application Number 2014-138684, filed Jul. 4, 2014, the disclosure of which is hereby incorporated by reference herein in its entirety.

BACKGROUND OF THE INVENTION

Field of the Invention

The present invention relates to a wire electric discharge machine configured to change the relative positions of a wire electrode and a workpiece by a servomotor, while applying a voltage to a machining gap between the wire electrode and the workpiece to generate electric discharge, and machine the workpiece into a desired shape.

Description of the Related Art

In machining power supplies prevalently used in modern wire electric discharge machines, a transistor is controlled to generate desired machining voltage and current. FIG. 3 shows a typical power circuit of a conventional machining power supply.

A machining power supply 1 comprises an electric discharge inducing circuit, configured to induce electric discharge in a machining gap between a workpiece 2 and a wire electrode 3, a current supply circuit for removal machining of the workpiece 2, and the like. The electric discharge inducing circuit comprises a first DC power supply 4 and is connected to the machining gap through a first switching element 5 and a current limiting resistor 6. On the other hand, the current supply circuit comprises a second DC power supply 7 and is connected to the machining gap through a second switching element 8 and a floating inductance 10. In many cases, moreover, the current supply circuit is additionally provided with a third switching element 9 for returning machining current to improve the efficiency of electric discharge machining. Further, the machining power supply 1 comprises a voltage detection circuit (electric discharge detection unit 11) and control unit 12. The electric discharge detection unit 11 detects whether or not electric discharge is generated in the machining gap. The control unit 12 on/off-controls the switching elements 5, 8 and 9.

The following is a description of the operation of the machining power supply shown in FIG. 3. FIG. 4 is a diagram illustrating the operation of the circuit in a case where the third switching element 9 is not used in the machining power supply shown in FIG. 3. FIG. 5 is a diagram illustrating the operation of the circuit in a case where the third switching element 9 is used in the machining power supply shown in FIG. 3. Signals from the control unit 12 for driving the first, second, and third switching elements 5, 8 and 9 are designated by S1, S2 and S3, respectively.

In the case where the third switching element 9 is not used, as shown in FIG. 4, the signal S1 is first output from the control unit 12 to the first switching element 5. If the gap distance of the machining gap is sufficiently small, electric discharge is generated. If the electric discharge in the machining gap is detected by the electric discharge detection unit 11, the control unit 12 is informed of the detection of the electric discharge. The control unit 12 turns off the signal S1 output to the first switching element 5, and at the same time, outputs the signal S2 that is on for a fixed time to the second switching element 8. As the second switching element 8 is turned on, a high current is supplied to the machining gap to perform removal machining of the workpiece. Thereafter, a quiescent time is provided to recover insulation in the machining gap, whereupon one cycle is completed.

In the case where the third switching element 9 is used, as shown in FIG. 5, the signal S3 for the third switching element 9 is turned on at the same time with the signal S2 for the second switching element 8, and the signal S3 is turned off with a delay after the signal S2 is turned off. In this way, a period during which an inter-electrode current is returned can be created, so that the width of the current waveform can be increased to increase the amount of machining. In other words, the efficiency of electric discharge machining can be improved.

In either of the cases where the third switching element 9 is and is not used, high-speed, high-precision machining can be achieved by changing the timing and duration of the signals S1 to S3 for driving the first to third switching elements 5, 8 and 9, depending on the materials, diameters, thicknesses, etc., of the wire electrode and the workpiece or circumstances during machining.

Japanese Patent Application Laid-Open No. 2012-166332 discloses a technique in which a current waveform (wide, low-peak waveform) that facilitates the constituents of a wire electrode to adhere to a core is obtained by controlling the first to third switching elements using the current supply circuit comprising the switching elements. More specifically, the current rise time is reduced, while the reflux time is increased (or the on-times of the signals S2 and S3 in the power supply device shown in FIG. 3 are reduced and increased, respectively). The technique disclosed in Japanese Patent Application Laid-Open No. 2012-166332 is characterized in that a wider current waveform should essentially be achieved by the third switching element. Further, Japanese Patent Application Laid-Open No. 2014-79876 discloses a technique in which a wire electrode is inclined so that its constituents can adhere to both the upper and lower sides of the core.

In the technique disclosed in Japanese Patent Application Laid-Open No. 2012-166332, however, sufficient adhesion to actually hold the core cannot always be achieved. Although the constituents of the wire electrode should be deposited according to welding conditions in FIG. 3 (numerals in the drawings of Japanese Patent Application Laid-Open No. 2012-166332), for example, sufficient constituents are not actually deposited. This is because gradual melting of the wire electrode and the workpiece is essential to the formation of the deposit and reduction of the gradient of the current rise is an effective solution this problem. The necessity of the reduction of the gradient is not mentioned in Japanese Patent Application Laid-Open No. 2014-79876. If the gradient is low (or if the rise is gentle), moreover, it is unnecessary to deliberately provide the third switching element to generate wide pulses.

SUMMARY OF THE INVENTION

Accordingly, the object of the present invention is to provide a wire electric discharge machine utilizing adhesion of a wire electrode and capable of changing electrical conditions in a part of a machining path so that the constituents of the wire electrode can reliably adhere to a machining groove, thereby preventing a core from dropping.

In order to produce a sufficient deposit of the constituents of the wire electrode, a variable DC power supply for use as a second DC power supply and a control device for controlling an output voltage thereof are provided so that the output voltage of the variable DC power supply is made lower than during normal machining in a machining path in which the deposit is expected to be produced, and that the on-time of a signal for driving a second switching element in a current supply circuit for removal machining of a workpiece is made longer than during the normal machining. Since wide pulses are not essential, only first and second switching elements are indispensable.

A wire electric discharge machine according to the present invention, which utilizes adhesion of constituents of a wire electrode, is configured to apply a voltage to an machining gap between the wire electrode and a workpiece, thereby generating electric discharge to machine the workpiece, and comprises: a DC power supply; a first switching element disposed in series between the DC power supply and the machining gap; a variable DC power supply and a second switching element disposed in series between the variable DC power supply and the machining gap; and a control unit for on/off-controlling the first and second switching elements and controlling an output voltage of the variable DC power supply. The control unit is configured to output signals for turning on and off the first and second switching elements to separate the workpiece and a portion to be cut off from the workpiece along a machining path, and output a signal for making the output voltage of the variable DC power supply lower than during the normal machining and the on-time of the second switching element longer than during the normal machining, at least in a part of the machining path to deposit the constituents of the wire electrode are deposited between the workpiece and the portion to be cut off from the workpiece to bond the workpiece and the portion to be cut off.

According to the present invention configured as described above, there can be provided a wire electric discharge machine utilizing adhesion of a wire electrode and capable of changing electrical conditions in a part of a machining path so that the constituents of the wire electrode can reliably adhere to a machining groove, thereby preventing a core from dropping.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Figure 1:
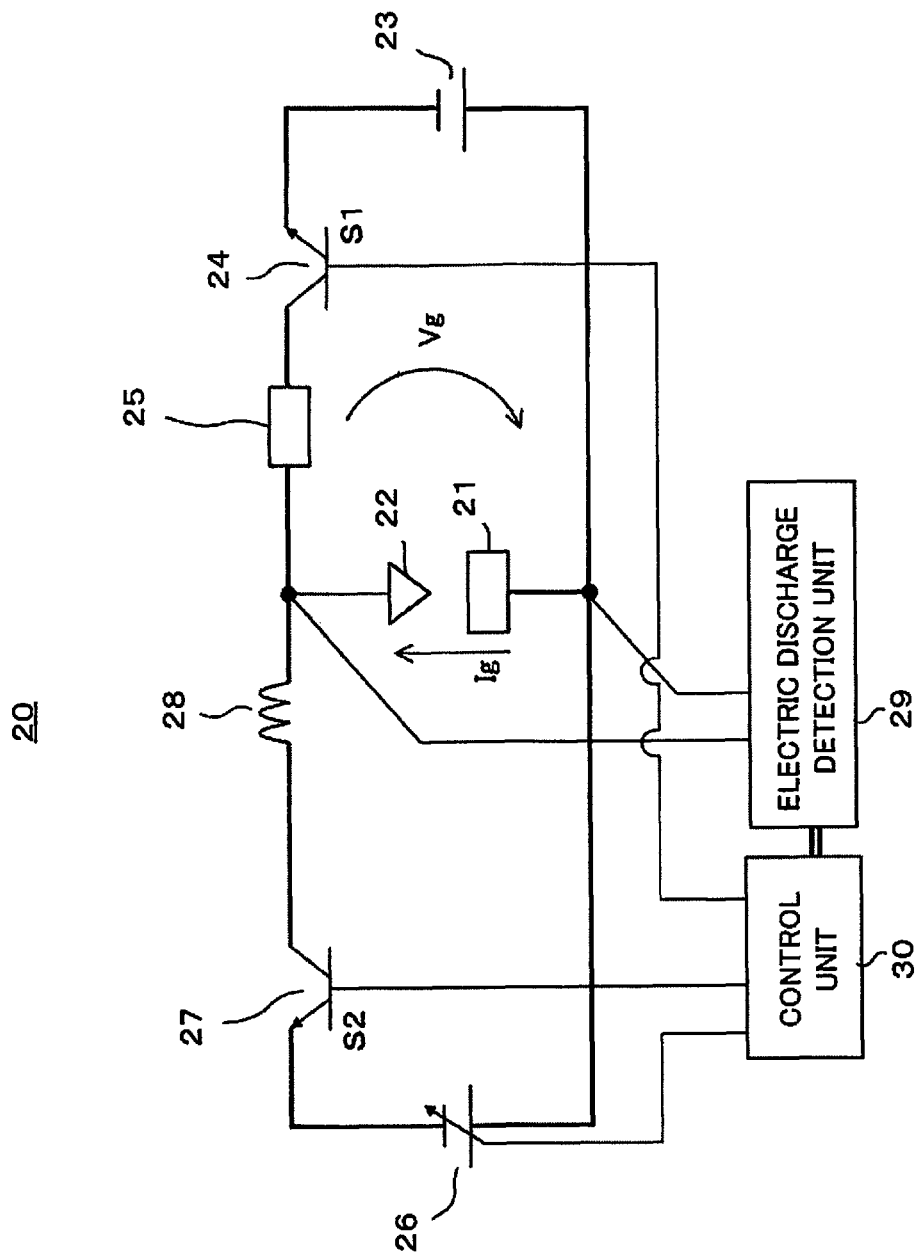
FIG. 1 is a diagram showing a machining power supply of a wire electric discharge machine according to one embodiment of the present invention.

FIG. 1 is a diagram showing a machining power supply 20 of a wire electric discharge machine according to one embodiment of the present invention. The machining power supply 20 comprises an electric discharge inducing circuit, configured to induce electric discharge in a machining gap between a workpiece 21 and a wire electrode 22, a current supply circuit for removal machining of the workpiece 21, and the like. The electric discharge inducing circuit comprises a first DC power supply 23 and is connected to the machining gap through a first switching element 24 and a current limiting resistor 25. On the other hand, the current supply circuit comprises a variable DC power supply 26 and is connected to the machining gap through a second switching element 27 and a floating inductance 28. Further, the machining power supply 20 comprises a voltage detection circuit (an electric discharge detection unit 29) and a control unit 30. The electric discharge detection unit 29 detects whether or not electric discharge is generated in the machining gap and informs the control unit 30 of the result of the detection. The control unit 30 on/off-controls the switching elements 24 and 27. A voltage applied to the machining gap is represented by a gap voltage Vg, and a current that flows across the machining gap is represented by an inter-electrode current Ig.

Figure 2:
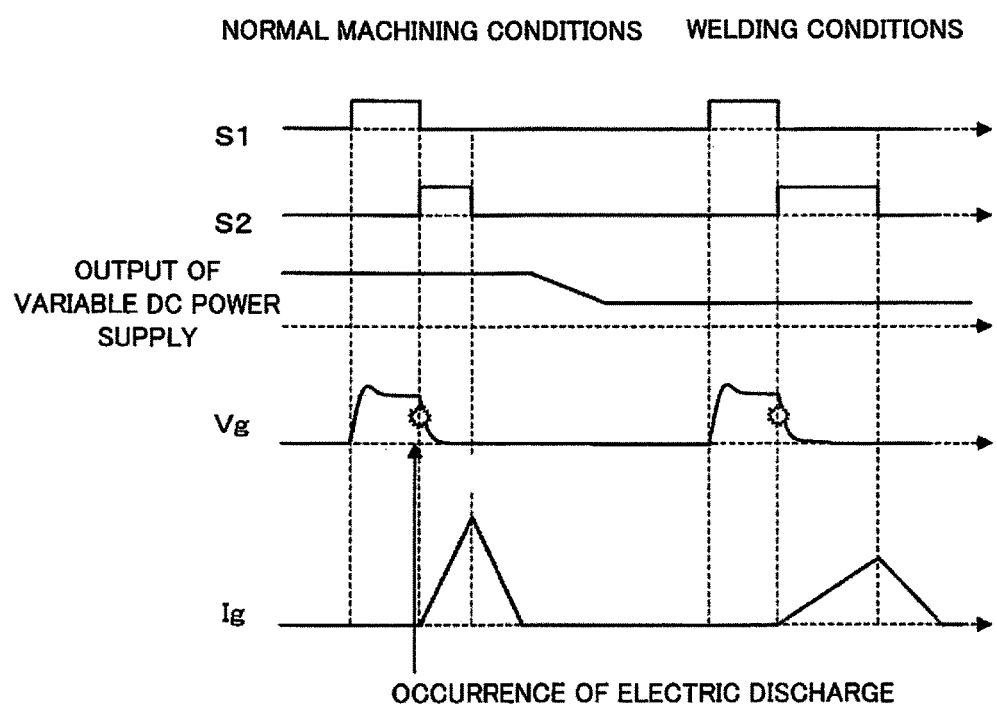
FIG. 2 is a diagram illustrating the operation of the machining power supply shown in FIG. 1.
Figure 3:
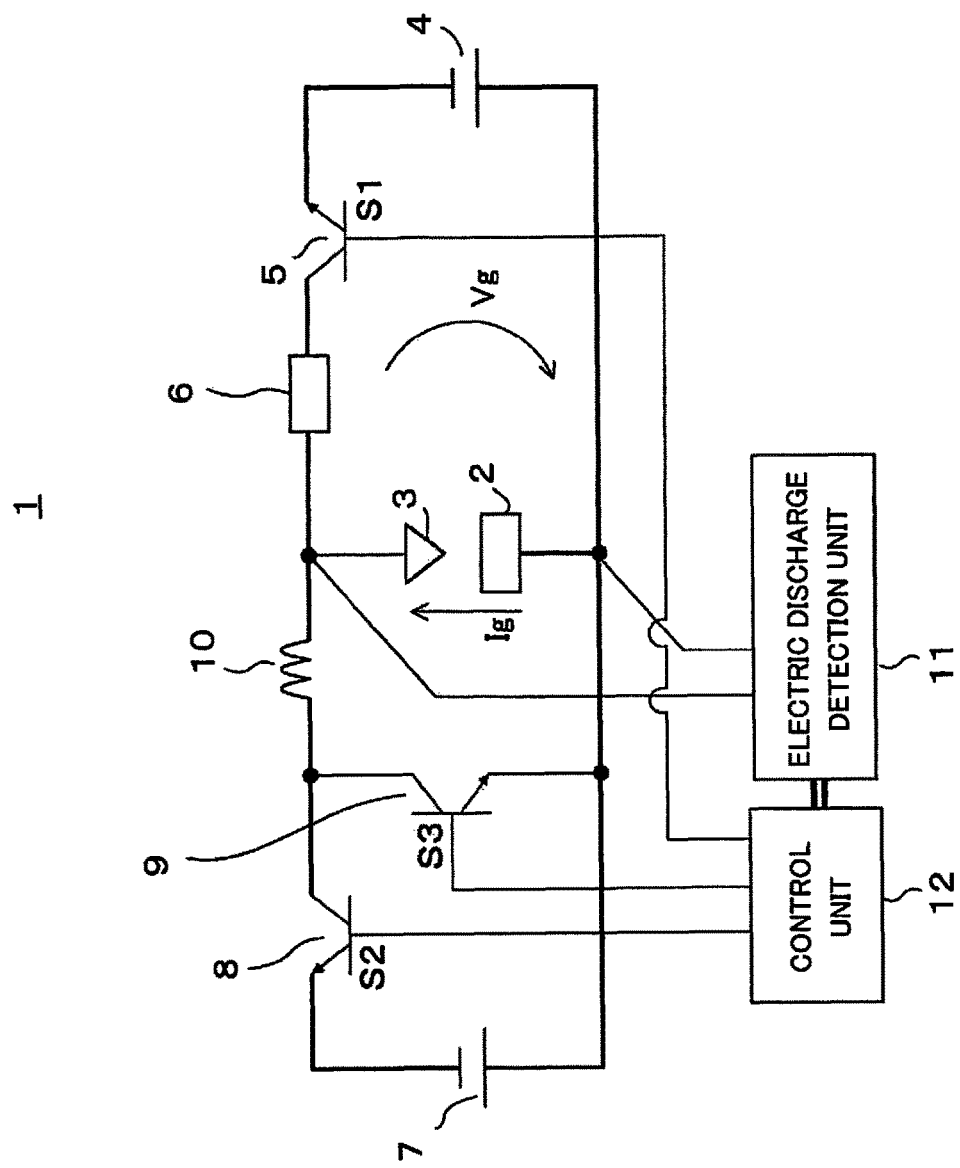
FIG. 3 is a diagram showing a machining power supply of a conventional wire electric discharge machine.
Figure 4:
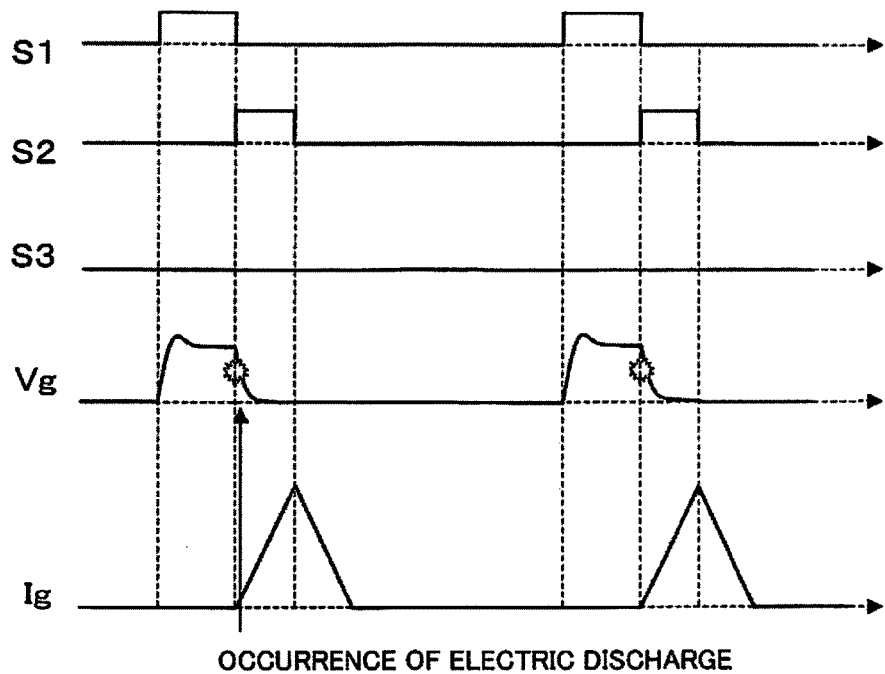
FIG. 4 is a diagram illustrating the operation of a circuit in a case where a third switching element is not used in the machining power supply shown in FIG. 3.
Figure 5:
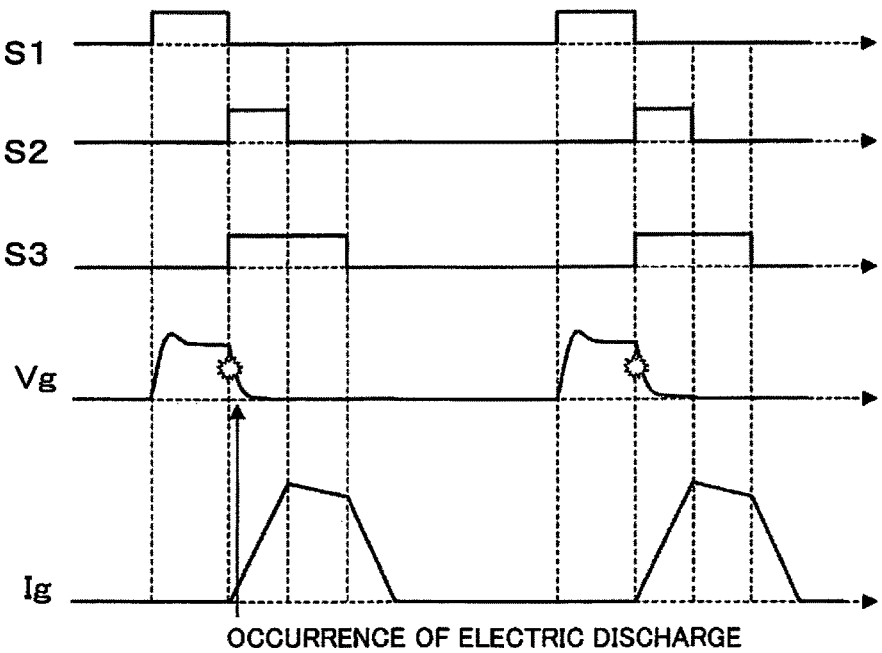
FIG. 5 is a diagram illustrating the operation of the circuit in a case where the third switching element is used in the machining power supply shown in FIG. 3.
Figure 6:
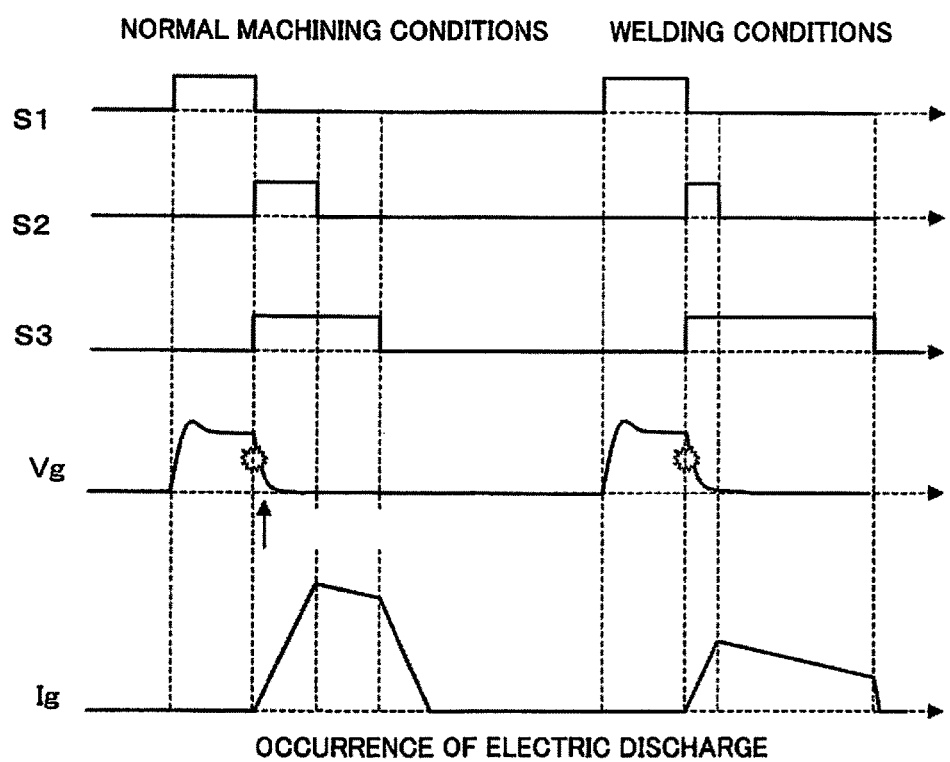
FIG. 6 is a diagram illustrating welding conditions for the machining power supply of the conventional wire electric discharge machine.

FIG. 2 is a diagram illustrating the operation of the machining power supply shown in FIG. 1. Generally, the first DC power supply 23 is available at 60 to 100 V. The standard variable DC voltage of the variable DC power supply 26 for welding ranges from ¼ to ½ of that for normal machining. Further, the standard on-time of a signal S2 for driving the second switching element 27 for welding ranges from two to four times that for normal machining. The first DC power supply 23 according to the present embodiment may be a variable DC power supply.

Normal machining conditions will be described first. As shown in FIG. 2, a signal S1 is first output from the control unit 30 to the first switching element 24. If the gap distance of the machining gap is sufficiently small, electric discharge is generated. If the electric discharge in the machining gap is detected by the electric discharge detection unit 29, the control unit 30 is informed of the detection of the electric discharge. On receiving a signal indicative of the detection of the electric discharge, the control unit 30 turns off the signal S1 output to the first switching element 24, and at the same time, outputs the signal S2 that is on for a fixed time to the second switching element 27. As the second switching element 27 is turned on by the signal S2, a high current is supplied to the machining gap to perform removal machining of the workpiece 21. Thereafter, a quiescent time is provided to recover insulation in the machining gap, whereupon one cycle is completed.

The following is a description of welding conditions. When the wire electrode 22 moves relative to the workpiece 21 to reach a core securing position while performing electric discharge machining along a machining path, the normal machining conditions are replaced by the welding conditions for the workpiece machining.

As shown in FIG. 2, the magnitude of the DC voltage output from the variable DC power supply 26 is changed to a level equal to ¼ to ½ of that for the normal machining conditions. The signal S1 is first output from the control unit 30 to the first switching element 24. If the gap distance of the machining gap is sufficiently small, electric discharge is generated. If the electric discharge in the machining gap is detected by the electric discharge detection unit 29, the control unit 30 is informed of the detection of the electric discharge. On receiving the signal indicative of the detection of the electric discharge, the control unit 30 turns off the signal S1 output to the first switching element 24, and at the same time, outputs the signal S2 that is on for the fixed time to the second switching element 27. As the second switching element 27 is turned on by the signal S2, a current is supplied to the machining gap to perform machining of the workpiece 21. Thereafter, a quiescent time is provided to recover insulation in the machining gap, whereupon one cycle is completed. The inclination of the inter-electrode current Ig can be reduced by reducing the voltage of the variable DC power supply 26 under the welding conditions. Thus, a sufficient amount of deposit, formed of the constituents of the wire electrode 22, can be made to adhere to a machining groove of the workpiece 21.

The invention claimed is:

1. A wire electric discharge machine configured to apply a voltage to a machining gap between a wire electrode and a workpiece and generate electric discharge to machine the workpiece, the wire electric discharge machine comprising:
    a DC power supply;
    a first switching element disposed in series between the DC power supply and the machining gap;
    a variable DC power supply;
    a second switching element disposed in series between the variable DC power supply and the machining gap; and
    a controller configured
        to control the first and second switching elements,
        to output a control signal to the variable DC power supply, and
        to cause the variable DC power supply to output
            a first output voltage for a normal machining operation; and
            a second output voltage for a welding operation, the second output voltage being lower than the first output voltage,
    wherein the controller is further configured,
        (a) during the normal machining operation when the variable DC power supply is controlled to output the first output voltage,
            (1) to control the first switching element to induce electric discharge in the machining gap, and
            (2) upon detection of the electric discharge, to control the second switching element to turn on for a time period, and
        (b) during the welding operation when the variable DC power supply is controlled to output the second output voltage
            (1) to control the first switching element to induce electric discharge in the machining gap, and
            upon detection of the electric discharge, to control the second switching element to turn on for a time period longer than the time period in the normal machining operation, to reduce the gradient of a current rise in the machining gap relative to the normal machining operation to deposit constituents of the wire electrode between the workpiece and a portion to be cut off from the workpiece to bond the workpiece and the portion to be cut off.

* * * * *